(12) United States Patent
Nishimura

(10) Patent No.: US 8,449,426 B2
(45) Date of Patent: May 28, 2013

(54) CONTINUOUSLY VARIABLE TRANSMISSION AND AUTOMOBILE DRIVE SYSTEM

(75) Inventor: Yuji Nishimura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 42 days.

(21) Appl. No.: 13/338,149

(22) Filed: Dec. 27, 2011

(65) Prior Publication Data

US 2012/0178577 A1     Jul. 12, 2012

(30) Foreign Application Priority Data

Jan. 6, 2011   (JP) ................................. 2011-001215

(51) Int. Cl.
*F16H 3/70*      (2006.01)

(52) U.S. Cl.
USPC ............ 475/170; 475/162; 475/172; 475/168

(58) Field of Classification Search
USPC ................................................ 475/160–179
See application file for complete search history.

(56) References Cited

U.S. PATENT DOCUMENTS

| | | | |
|---|---|---|---|
| 3,951,005 A * | 4/1976 | Dahlstrom | 74/125.5 |
| 7,108,626 B2 * | 9/2006 | Friedmann | 475/8 |
| 8,210,290 B2 * | 7/2012 | Simon et al. | 180/65.225 |
| 2012/0252630 A1 * | 10/2012 | Sasaki | 477/80 |

FOREIGN PATENT DOCUMENTS

DE         102009039993 A1      4/2010

* cited by examiner

*Primary Examiner* — David D Le
*Assistant Examiner* — Derek D Knight
(74) *Attorney, Agent, or Firm* — Ditthavong Mori & Steiner, P.C.

(57) ABSTRACT

A continuously variable transmission includes a one-way clutch, a plurality of linking members, and a variable gear ratio mechanism. The one-way clutch includes an input shaft, a plurality of eccentric discs, a first crank member, a second crank member, an output member, an input member, and an engaging member. The input shaft is rotatable about an input center axial line under the rotational force. The plurality of eccentric discs is disposed around the input center axial line at equal intervals in a circumferential direction.

5 Claims, 17 Drawing Sheets

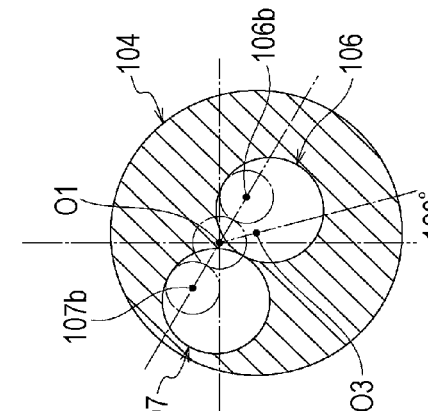
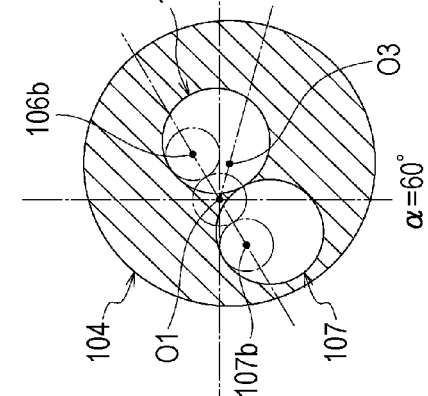
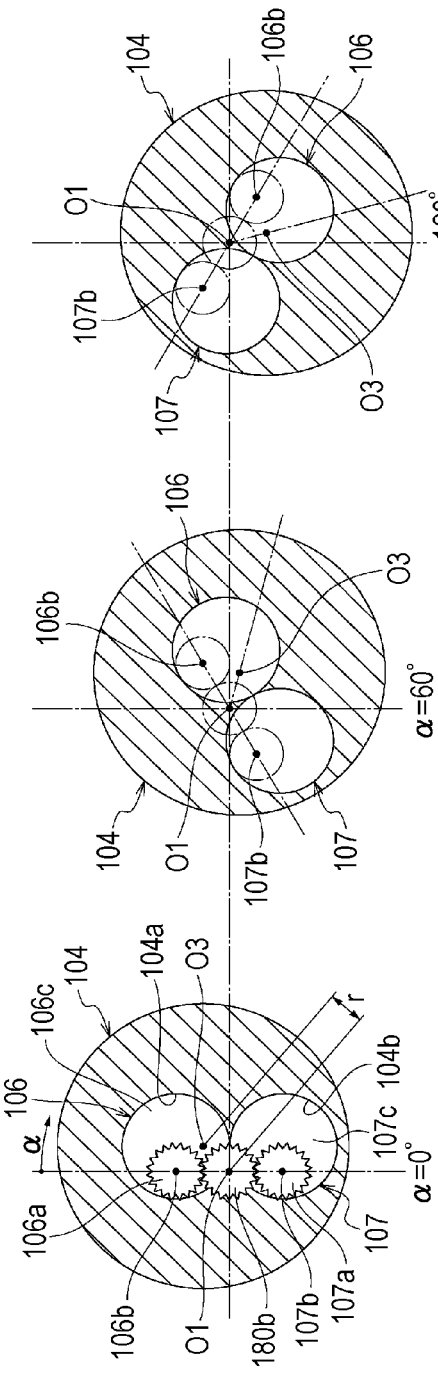
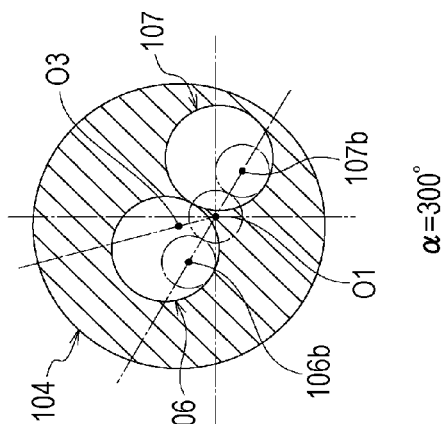
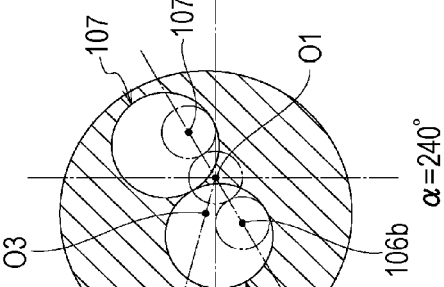
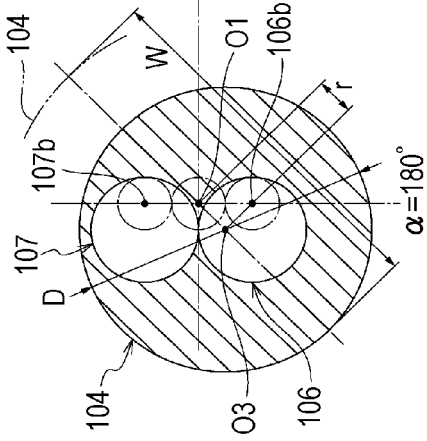

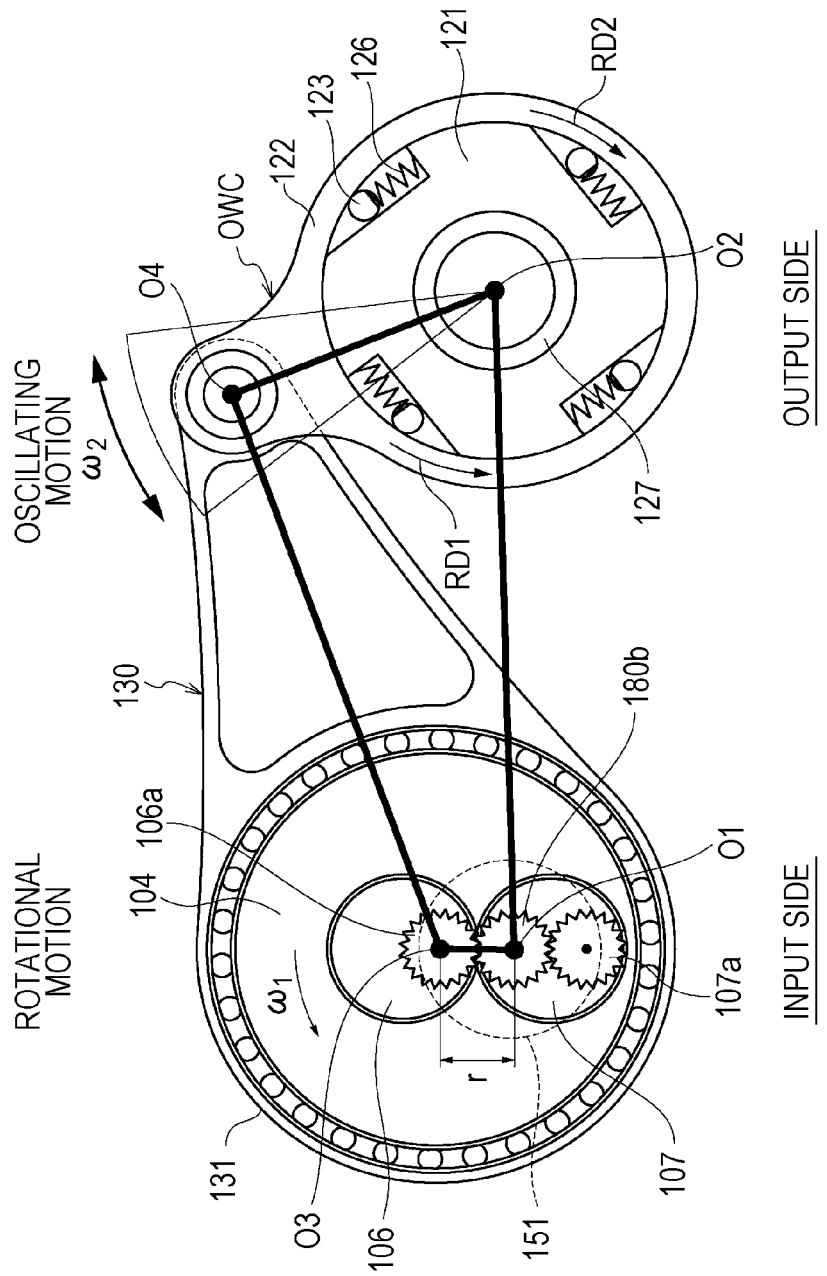

BACKGROUND ART

CONTINUOUSLY VARIABLE TRANSMISSION AND AUTOMOBILE DRIVE SYSTEM

CROSS-REFERENCE TO RELATED APPLICATIONS

The present application claims priority under 35 U.S.C. §119 to Japanese Patent Application No. 2011-001215, filed Jan. 6, 2011, entitled "Continuously Variable Transmission and Automobile Drive System". The contents of this application are incorporated herein by reference in their entirety.

BACKGROUND OF THE INVENTION

1. Field of the Invention

The present invention relates to a continuously variable transmission and an automobile driving system.

2. Discussion of the Background

In the related art, there is a continuously variable transmission which converts rotational motion of the output shaft of an engine into oscillating motion, and further converts the oscillating motion into rotational motion which is output from an output shaft of the transmission (e.g., German Patent No. 10 2009 039 993). The mechanism described in German Patent No. 10 2009 039 993 which converts rotational motion into oscillating motion includes a pinion 209, an eccentric disc 205 having internal teeth meshing with the teeth of the pinion 209, and an inner disc 204 which maintains the position relation between the pinion 209 and eccentric disc 205, wherein the eccentric disc 205 rotates eccentrically as the pinion 209 rotates, and the gear ratio is changed by changing the eccentricity between the pinion 209 and eccentric disc 205, as shown in FIG. 17.

SUMMARY OF THE INVENTION

According to one aspect of the present invention, a continuously variable transmission to shift and output rotational force generated from a force source comprises a one-way clutch, a plurality of linking members, and a variable gear ratio mechanism. The one-way clutch comprises an input shaft, a plurality of eccentric discs, a first crank member, a second crank member, an output member, an input member, and an engaging member. The input shaft is rotatable about an input center axial line under the rotational force. The plurality of eccentric discs is disposed around the input center axial line at equal intervals in a circumferential direction. Each of the eccentric discs comprises a first support point and through holes. The first support point is arranged at a center of the eccentric disc. An eccentricity of the eccentric disc as to the input center axial line is changeable by the first support point. The eccentric discs are rotatable along with the input shaft about the input center axial line while maintaining the eccentricity. The through holes extend parallel to the input center axial line. The first crank member comprises a plurality of first crank pins rotatably passed through the through holes provided in the plurality of eccentric discs. The first crank pins are linked to each other. The plurality of first crank journals have center axial lines provided at positions equidistantly offset from center axial lines of the first crank pins. The second crank member comprises a plurality of second crank pins rotatably passed through the through holes provided in the plurality of eccentric discs. The second crank pins are linked to each other. The plurality of second crank journals have center axial lines provided at positions equidistantly offset from center axial lines of the second crank pins. The output member is rotatable about an output center axial line which is distanced from the input center axial line. The input member is provided to oscillate on the output center axial line under external rotational direction force. The engaging member is to place the input member and the output member in one of a mutually locked state and an unlocked state. The one-way clutch is provided to transmit the rotational force input to the input member to the output member when the rotational speed of the input member in the forward direction exceeds the rotational speed of the output member in the forward direction so as to convert oscillating motion of the input member into rotational motion of the output member. The plurality of linking members each includes a first end and a second end. The first end is rotatably linked to the first supporting points on a perimeter of the eccentric discs. The second end is rotatably linked to a second supporting point provided on the input member of the one-way clutch at a position distanced from the output center axial line, such that rotational motion provided from the input shaft to the eccentric discs is transmitted to the input member of the one-way clutch as oscillating motion of the input member. The variable gear ratio mechanism comprises an actuator to synchronously rotate the first crank pins and the second crank pins each centered on the first and second crank journals, so as to adjust an eccentricity of the first support points as to the input center axial line, thereby changing an oscillating angle of oscillating motion transmitted from the eccentric discs to the input member of the one-way clutch. The gear ratio is changed when rotational force input to the input shaft is transmitted as rotational force, to the output member of the one-way clutch via the eccentric discs and the linking members. Setting of the eccentricity to zero is enabled so as to set the gear ratio to infinity.

According to another aspect of the present invention, an automobile driving system comprises an engine, the continuously variable transmission, driving wheels, and a rotationally driven member. The engine serves as the force source to generate rotational force. The continuously variable transmission is configured to shift and output rotational force generated from the engine. The rotationally driven member is linked to the output member of the one-way clutch to transmit rotational force transmitted to the output member to the driving wheels. Rotational force generated by the engine is input to the rotationally driven member via the continuously variable transmission.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIGS. 8A through 8F are operation diagrams illustrating an eccentric disc of the continuously variable transmission being rotated on the input center axial line with eccentricity fixed, every 60° in rotational angle.

FIG. 10A is a diagram illustrating a state where eccentricity is "zero", FIG. 10B is a diagram illustrating a state where eccentricity is "medium", and FIG. 10C is a diagram illustrating a state where eccentricity is "great".

FIG. 11 is a diagram illustrating a principle of a four-bar linkage mechanism of the continuously variable transmission.

FIG. 12A is a diagram illustrating a state where eccentricity is "great", FIG. 12B is a diagram illustrating a state where eccentricity is "medium", which is smaller than the case in FIG. 12A, and FIG. 12C is a diagram illustrating a state where eccentricity is "small", which is smaller than the case in FIG. 12B.

DESCRIPTION OF THE EMBODIMENTS

Figure 1:
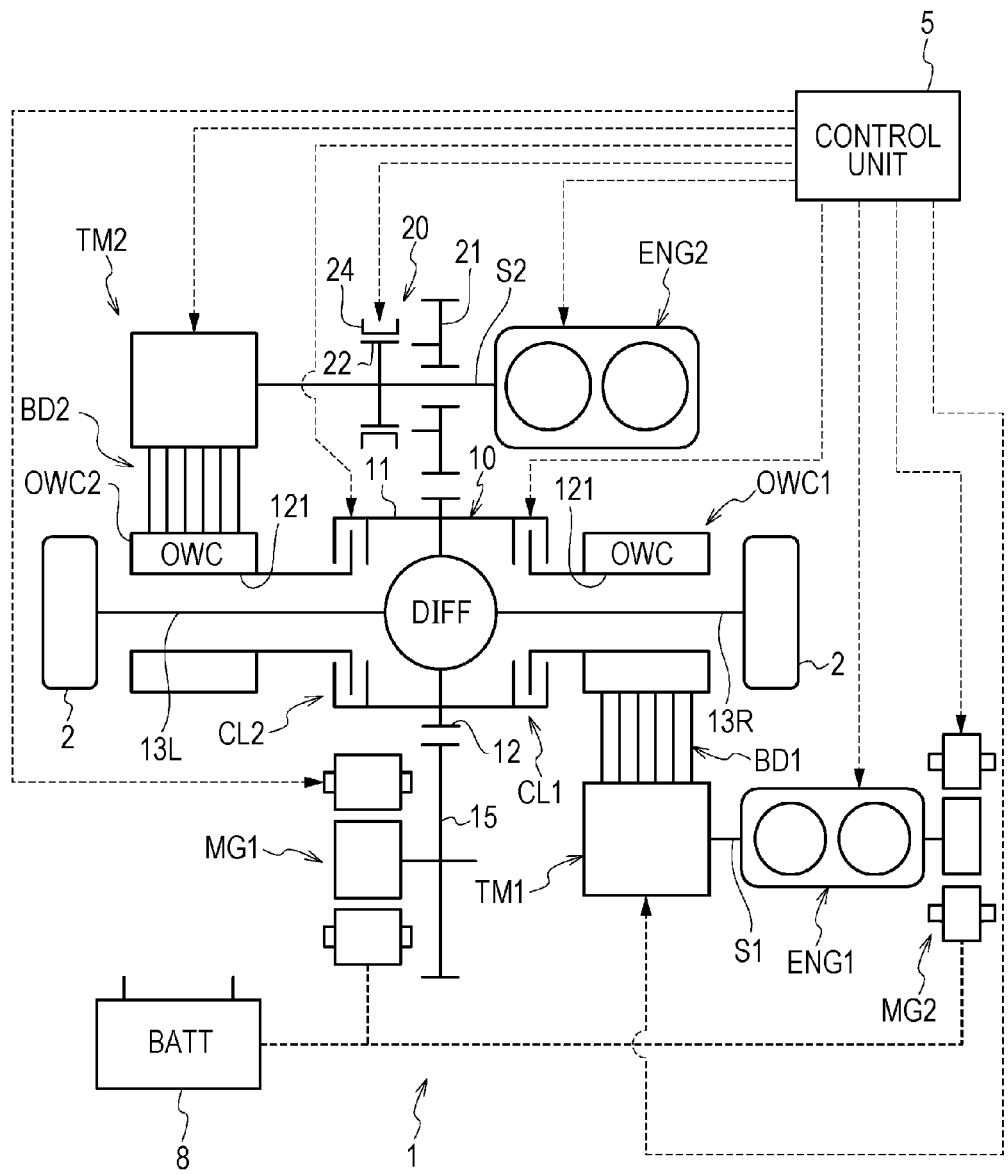
FIG. 1 is an explanatory diagram illustrating an automobile driving system having a continuously variable transmission according to an embodiment of the present invention.

According to the embodiment of the present invention, a continuously variable transmission (e.g., a continuously variable transmission BD1 and BD2 in the later-described embodiments) which shifts and outputs rotational force generated from a force source (e.g., a first engine ENG1 and second engine ENG2 in the later-described embodiments) includes: a one-way clutch (e.g., a first one-way clutch OWC1 and second one-way clutch OWC2 in the later-described embodiments) including an input shaft (e.g., a journal supporting member 151 in the later-described embodiments) configured to rotate on an input center axial line (e.g., an input center axial line O1 in the later-described embodiments) under the rotational force, a plurality of eccentric discs (e.g., eccentric discs 104 in the later-described embodiments), disposed around the input center axial line at equal intervals in the circumferential direction, each having at the center thereof, a first support point (e.g., a first support point O3 in the later-described embodiments) whereby the eccentricity thereof as to the input center axial line (e.g., eccentricity r in the later-described embodiments) is changeable and the eccentric discs rotate along with the input shaft on the input center axial line while maintaining the eccentricity, and through holes (e.g., through holes 104a and 104b in the later-described embodiments) formed therein extending parallel to the input center axial line, a first crank member (e.g., a first crank member 106 in the later-described embodiments) having a plurality of first crank pins (e.g., first crank pins 106c through 106h in the later-described embodiments) which are rotatably passed through the through holes formed in the plurality of eccentric discs, and which are each linked, and a plurality of first crank journals (e.g., first crank journals 106p, 106q, 106r in the later-described embodiments) having center axial lines thereof (e.g., center axial lines 106b in the later-described embodiments) at positions equidistantly offset from the center axial lines of the first crank pins (e.g., center axial lines 106k in the later-described embodiments), a second crank member (e.g., a second crank member 107 in the later-described embodiments) having a plurality of second crank pins (e.g., second crank pins 107c through 107h in the later-described embodiments) which are rotatably passed through the through holes formed in the plurality of eccentric discs, and which are each linked, and a plurality of second crank journals (e.g., second crank journals 107p, 107q, 107r in the later-described embodiments) having center axial lines thereof (e.g., center axial lines 107b in the later-described embodiments) at positions equidistantly offset from the center axial lines of the second crank pins (e.g., center axial lines 107k in the later-described embodiments), an output member (e.g., clutch inner 121 in the later-described embodiments) which rotates on an output center axial line (e.g., an output center axial line O2 in the later-described embodiments) which is distanced from the input center axial line, an input member (e.g., a clutch outer 122 in the later-described embodiments) configured to oscillate on the output center axial line under external rotational direction force, and an engaging member (e.g., a roller 123 in the later-described embodiments) configured to place these input member and output member in a mutually locked state or unlocked state, where, in the event that the rotational speed of the input member in the forward direction exceeds the rotational speed of the output member in the forward direction, the rotational force input to the input member is transmitted to the output member, thereby converting the oscillating motion of the input member into rotational motion of the output member; a plurality of linking members (e.g., linking members 130 in the later-described embodiments) each rotatably linked at one end thereof to the first supporting points on the perimeter of the eccentric discs, and the other end rotatably linked to a second supporting point (e.g., second supporting point O4 in the later-described embodiments) provided on the input member of the one-way clutch at a position distanced from the output center axial line thereupon, such that rotational motion provided from the input shaft to the eccentric discs is transmitted to the input member of the one-way clutch as oscillating motion of the input member; and a variable gear ratio mechanism (e.g., variable gear ratio mechanisms 112 and 112a in the later-described embodiments) including an actuator configured to synchronously rotate the first crank pins and the second crank pins each centered on the first and second crank journals, so as to adjust the eccentricity of the first support points as to the input center axial line, thereby changing the oscillating angle of the oscillating motion transmitted from the eccentric discs to the input member of the one-way clutch, wherein the gear ratio is changed at the time of rotational force input to the input shaft being transmitted as rotational force, to the output member of the one-way clutch via the eccentric discs and the linking members, and wherein setting of the eccentricity to zero is enabled, so as to set the gear ratio to infinity.

The continuously variable transmission may further include: driven gears (e.g., driven gears 106a and 107a in the later-described embodiments) configured to the first and second crank journals; a case (e.g., a transmission case 160 in the later-described embodiments); and a ring gear (e.g., a ring gear 115 in the later-described embodiments) configured to mesh with the driven gears and rotatably support the first and second crank journals, the ring gear being rotatable as to the case along with the first and second crank journals; the actuator (e.g., an actuator 180 in the later-described embodiments) which the variable gear ratio mechanism has further including a pinion (e.g., a pinion 180b in the later-described embodiments) rotating on the input center axial line and meshing with the driven gears of the first and second crank journals, wherein the actuator is fixed to the case.

The continuously variable transmission may further include: driven gears configured to the first and second crank journals; a case; and a journal supporting member (e.g., a journal supporting member 153 in the later-described embodiments) configured to rotatably support the first and second crank journals, the journal supporting member being rotatable as to the case along with the first and second crank journals; the actuator (e.g., an actuator 180 in the later-described embodiments) which the variable gear ratio mechanism has further including a pinion (e.g., a pinion 180b in the later-described embodiments) rotating on the input center axial line and meshing with the driven gears of the first and second crank journals, wherein the actuator is fixed to the journal supporting member.

With the embodiment of the present invention, there is no need to form internal teeth formed to mesh with a gear or to have sliding faces formed thereupon, as with conventional eccentric discs, and all that is necessary is to form through holes in the eccentric discs. Accordingly, working of the parts can be simplified, productivity of the eccentric discs and resultantly productivity of the continuously variable transmission can be improved, and costs can be reduced.

Also, the eccentricity of the first support point as to the input center axial line can be adjusted by controlling the rotational speed of the actuator, so the gear ratio can be easily changed. Also, the pinion rotating on the input center axial line provided to the actuator meshes with the driven gears of the crank journals of the two crank members, so axial alignment is facilitated.

According to the embodiment of the present invention, an automobile driving system includes: an engine (e.g., a first engine ENG1 and a second engine ENG2 in the later-described embodiments), serving as the force source generating rotational force; a continuously variable transmission according to any one of claims 1 through 3, configured to shift and output rotational force generated from the engine; driving wheels (e.g., driving wheels 2 in the later-described embodiments); and a rotationally driven member (e.g., a rotationally driven member 11 in the later-described embodiments) linked to the output member of the one-way clutch, so as to transmit rotational force, transmitted to the output member, to the driving wheels; wherein rotational force generated by the engine is input to the rotationally driven member via the continuously variable transmission.

According to the embodiment of the present invention, the continuously variable transmission enables smooth change in output rotations by continuously adjusting the gear ratio without changing the engine rotations, so the engine can be driven at efficient rotations, leading to reduced fuel consumption. Also, enabling an infinite gear ratio enables the force transmission from the input axis to the output shaft to be cut off, so the continuously variable transmission also serves as a clutch, which means that a clutch itself can be done away with and costs can be reduced.

The embodiments will now be described with reference to the accompanying drawings, wherein like reference numerals designate corresponding or identical elements throughout the various drawings.

An automobile drive system to which the continuously variable transmission according to an embodiment of the present invention is applied will be described with reference to the drawings. As shown in FIG. 1, the automobile drive system 1 has two engines, which are first and second engines ENG1 and ENG2 serving as driving force sources which independently generate rotational force, first and second transmissions TM1 and TM2 provided downstream of the driving force of the first and second engines ENG1 and ENG2, a rotationally driven member 11 which receives output rotations linked to the output portion of the transmissions TM1 and TM2, a main motor generator MG1 connected to this rotationally driven member 11, a sub motor generator MG2 connected to an output shaft S1 of the first engine ENG1, a battery 8 which can exchange electric power with the main motor generator MG1 and/or sub motor generator MG2, and a control unit 5 which controls starting of the vehicle, driving patterns, and the like by controlling these components.

The first and second transmissions TM1 and TM2 have one-way clutches OWC1 and OWC2 at the output portions thereof. The first and second one-way clutches OWC1 and OWC2 are disposed across a differential device 10, one on the right side and the other on the left in the direction of the width of the vehicle, and the clutch inners 121 of the first and second one-way clutches OWC1 and OWC2 are each linked together with a rotationally driven member 11 via separate first and second clutch mechanisms CL1 and CL2, respectively.

The first and second clutch mechanisms CL1 and CL2 are provided for controlling transmitting and cutting off of driving force between the clutch inners 121 of the first and second one-way clutches OWC1 and OWC2 and the rotationally driven member 11, so as to be in a transmittable state when ON and a disengaged state when OFF. Other types of clutches such as friction clutches or the like may be used for the first and second clutch mechanisms CL1 and CL2, but dog clutches are used here due to the small loss in transmission.

The rotationally driven member 11 is configured of a differential case of the differential device 10, with rotational force transmitted to the clutch inners 121 of the first and second one-way clutches OWC1 and OWC2 transmitted to left and right drive wheels 2 via the differential device 10 and left and right axle shafts 13L and 13R. The differential case (rotationally driven member 11) of the differential device 10 has a differential pinion and side gears, which are not shown in the drawings, attached thereto, with the left and right axle shafts 13L and 13R linked to the left and right side gears, such that the left and right axle shafts 13L and 13R rotate differentially.

The first and second engines ENG1 and ENG2 are engines which have different high-efficiency running regions, with the first engine ENG1 being an engine with a smaller engine displacement and the second engine ENG2 being an engine with greater displacement than the first engine ENG1. For example, the displacement of the first engine ENG1 is 500 cc, the displacement of the second engine ENG2 is 0037 cc, so the total displacement is 1500 cc. The combination of engine displacement is optional, of course.

The main motor generator MG1 and the rotationally driven member 11 are connected so as to be capable of transmitting force, by a drive gear 15 attached to the output shaft of the main motor generator MG1 and the drive gear 12 provided to the rotationally driven member 11 meshing.

For example, in the event that the main motor generator MG1 functions as a motor, driving force is transmitted from the main motor generator MG1 to the rotationally driven member 11. Also, when the main motor generator MG1 functions as a generator, force is input to the main motor generator MG1 from the rotationally driven member 11, and mechanical energy is converted into electric energy. At the same time, regenerative braking force acts on the rotationally driven member 11 from the main motor generator MG1.

Also, the sub motor generator MG2 is directly connected to an output shaft S1 of the first engine ENG1, so as to mutually transmit force with the output shaft S1. In this case as well, in the event of the sub motor generator MG2 functioning as a motor, driving force is transmitted from the sub motor generator MG2 to the output shaft S1 of the first engine ENG1. Also, in the event that the sub motor generator MG2 functions as a generator, force is transmitted from the output shaft S1 of the first engine ENG1 to the sub motor generator MG2.

With the automobile drive system 1 having the above components, the rotational force which the first engine ENG1 and second engine ENG2 generate are input to the first one-way clutch OWC1 and second one-way clutch OWC2 provided to the first transmission TM1 and the second transmission TM2, and the rotational force is input to the rotationally driven member 11 via the first one-way clutch OWC1 and second one-way clutch OWC2.

Also, with this automobile drive system 1, a synch mechanism 20 (a clutching unit also called a "starter clutch") is provided between an output shaft S2 of the second engine ENG2 and the rotationally driven member 11, so as to be capable of connecting and breaking off transmission of force between the rotationally driven member 11 and the output shaft S2 which is different from force transmission via the second transmission TM2. The synch mechanism 20 has a first gear 21 which constantly meshes with a drive gear 12 provided to the rotationally driven member 11 and is rotatably provided on the periphery of the output shaft S2 of the second engine ENG2, a second gear 22 provided on the periphery of the output shaft S2 of the second engine ENG2 so as to integrally rotate with the output shaft S2, and a sleeve 24 which is operated by sliding in the axial direction so as to engage or disengage the first gear 21 and the second gear 22. That is to say, the synch mechanism 20 forms a force transmission path which is different from the force transmission path via the second transmission TM2 and clutch mechanism CL2, and connects and cuts off force transmission on this force transmission path.

Configuration of Transmission

Next, the first and second transmissions TM1 and TM2 used with the automobile drive system 1 will be described. The first and second transmissions TM1 and TM2 are configured of continuously variable transmissions with almost the same configuration. The continuously variable transmissions in this case are configured of continuously variable transmissions BD (first continuously variable transmission BD1, second continuously variable transmission BD2) which are each an infinity variable transmission (also abbreviated to "IVT", a transmission of a type where the gear ration can be set to infinity and the output rotations set to zero without using a clutch). With IVTs, the gear ratio (ratio=1) can be changed variably and the maximum value of the gear ratio can be set to infinity ($\infty$).

Figure 2:
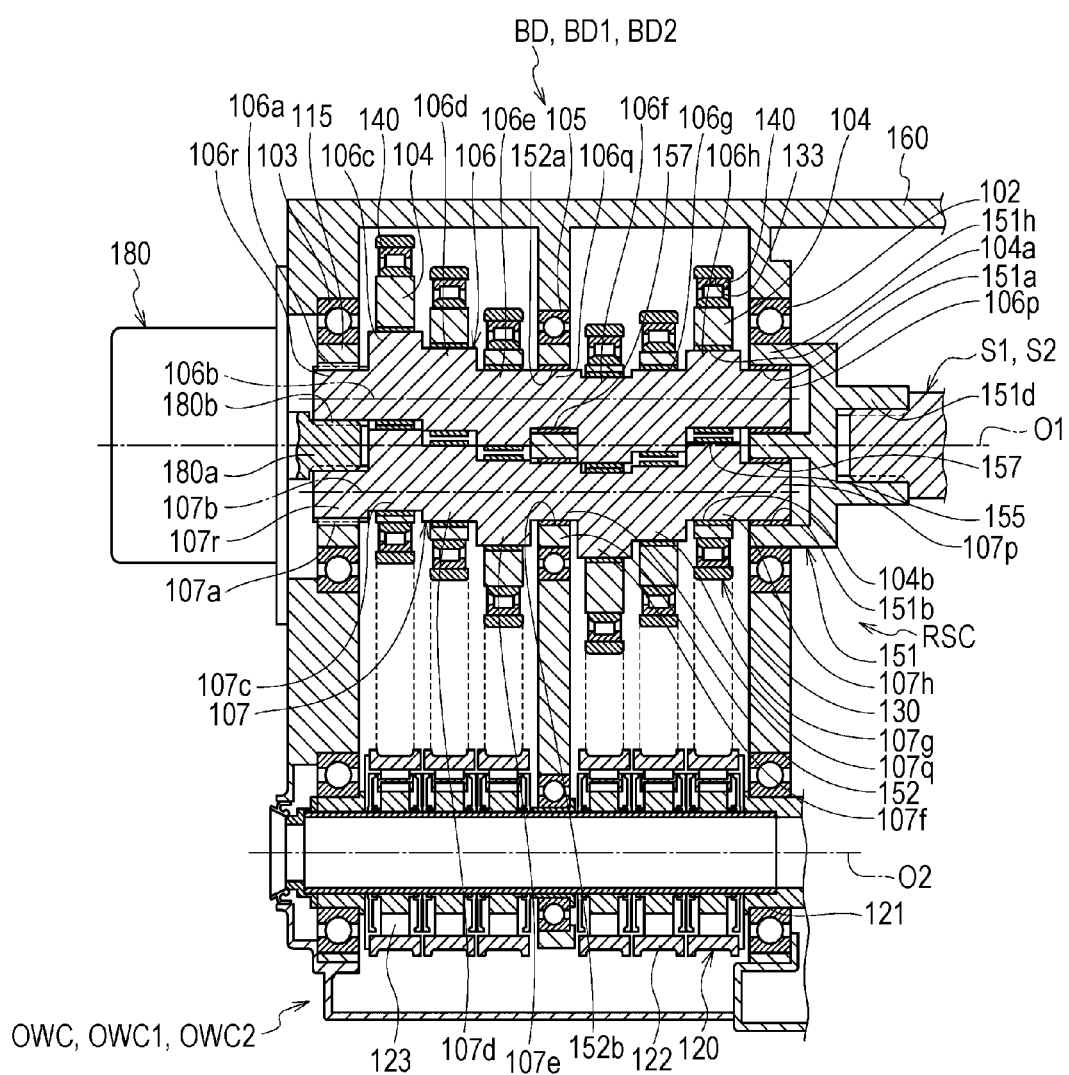
FIG. 2 is a cross-sectional diagram illustrating the continuously variable transmission.
Figure 3:
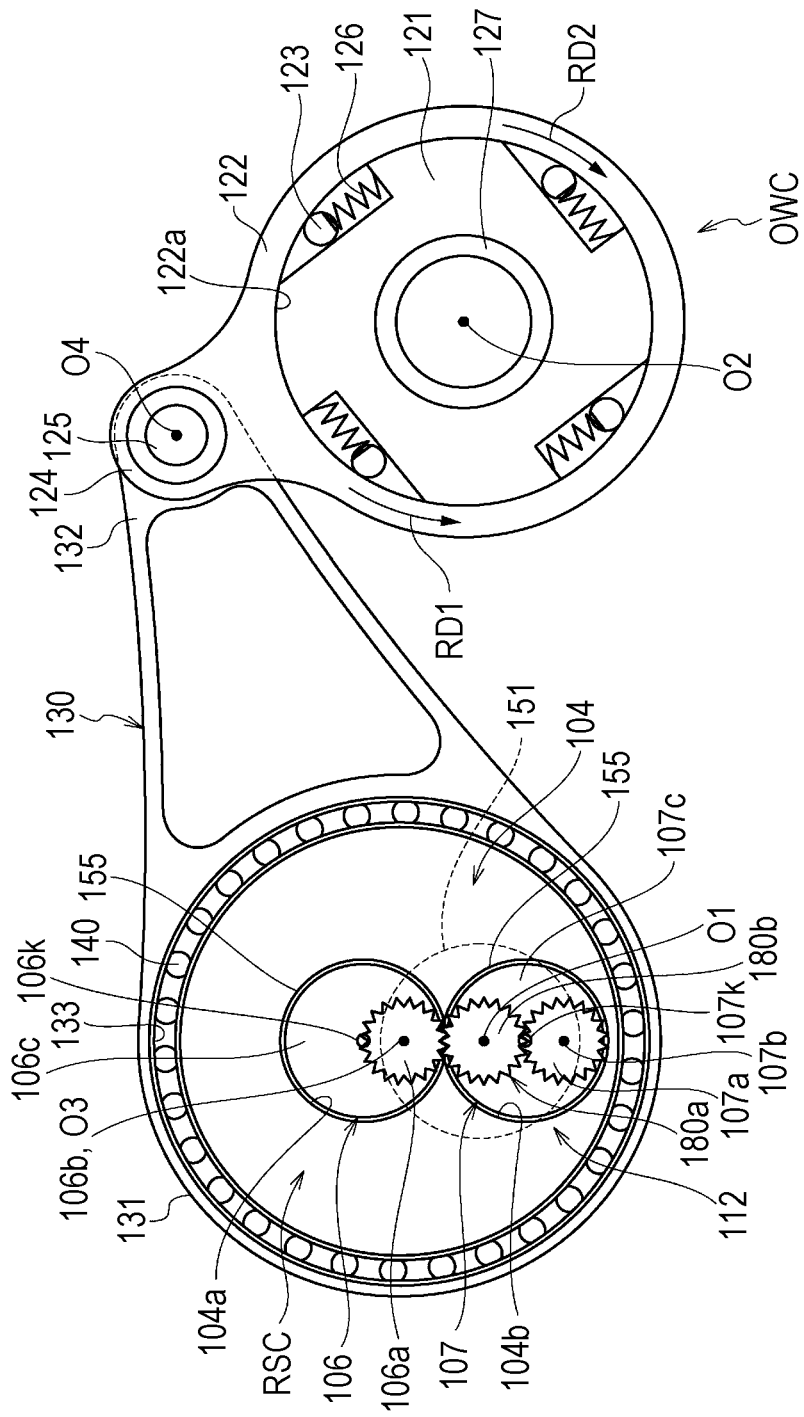
FIG. 3 is a side view illustrating the continuously variable transmission.
Figure 4:
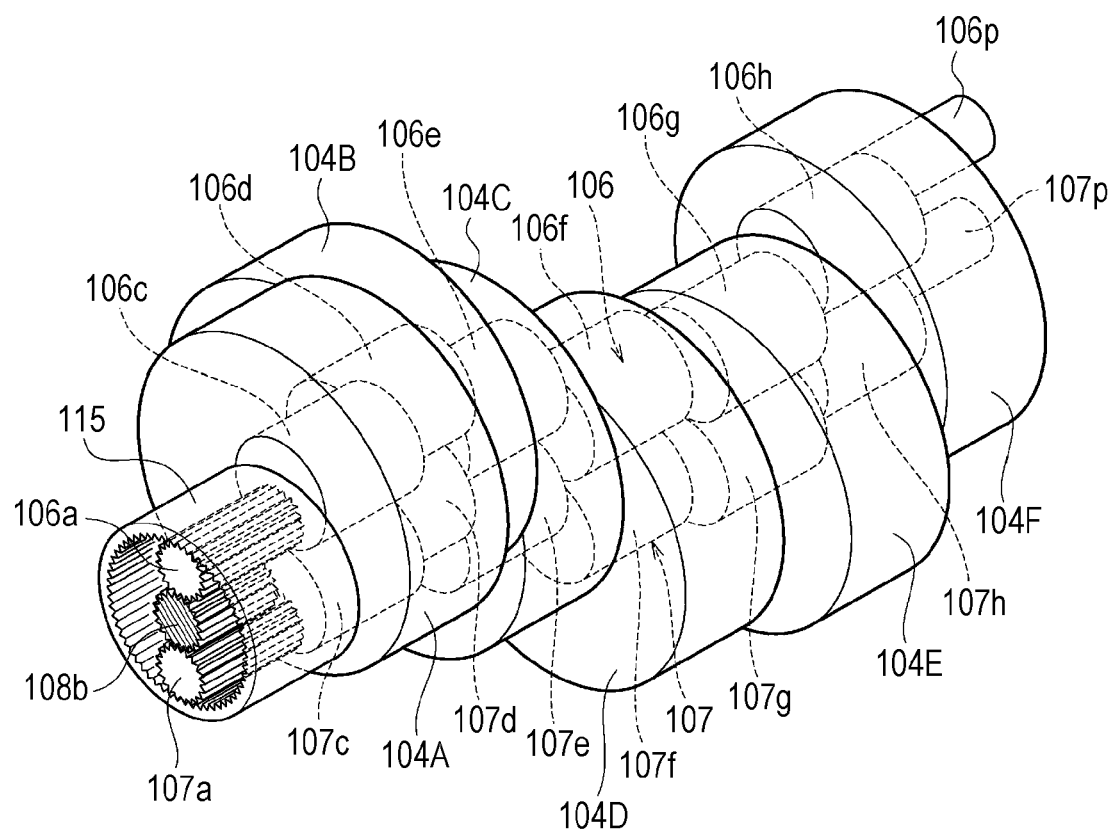
FIG. 4 is a perspective view illustrating principal portions of the continuously variable transmission.
Figure 5:
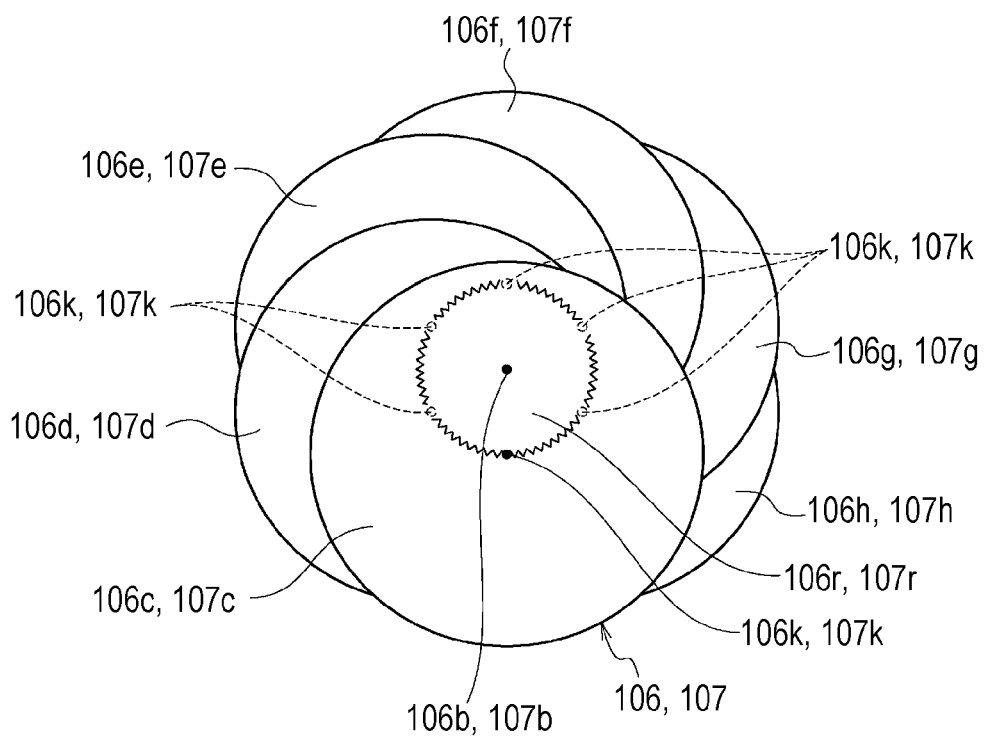
FIG. 5 is a side view of crank members in the continuously variable transmission.

As illustrated in FIG. 2, the continuously variable transmission BD has a journal supporting member 151 serving as an input shaft which is linked to output shafts S1 and S2 of the first and second engines ENG1 and ENG2 (see FIG. 1) and which rotates on an input center axial line O1 under rotational force from the engines ENG1 and ENG2, multiple (six with the present embodiment) eccentric discs 104 integrally rotating with the journal supporting member 151 via first and second crank members 106 and 107 (hereinafter, the six eccentric discs may also be referred to as 104A through 104F), linking members 130 of a number equal to that of the eccentric discs 104, to connect the input side and output side, and a one-way clutch 120 provided on the output side.

A shown in FIGS. 3, 4, and 6A and 6B as well, the multiple eccentric discs 104 are each formed circularly with a first support point O3 as the center, with the first support points O3 being provided at equal intervals in the circumferential direction of the input center axial line O1. The multiple eccentric discs 104 are provided so as to eccentrically rotate around the input center axial line O1 in accordance with the rotation of the journal supporting member 151, while each maintaining eccentricity r. Also, the multiple eccentric discs 104 are configured such that the eccentricity r of each first support point O3 as to the input center axial line O1 is changeable. Further, two through holes 104a and 104b are formed to each of the multiple eccentric discs 104, extending in parallel with the input center axial line O1.

As shown in FIGS. 2 through 5, the first crank member 106 has multiple first crank pins 106c through 106h which rotatably pass through the through hole 104a, which is one of the through holes 104a and 104b formed in each of the multiple eccentric discs 104, via slide bearings 155, the multiple first crank pins 106c through 106h each being linked, and first crank journals 106p, 106q, and 106r which have a center axial line 106b offset equal distances from a center axial line 106k of the first crank pins 106c through 106h.

In the same way, the second crank member 107 has multiple second crank pins 107c through 107h which rotatably pass through the other through hole 104b via slide bearings 155, the multiple first second pins 107c through 107h each being linked, and second crank journals 107p, 107q, and 107r which have a center axial line 107k offset equal distances from a center axial line 107b of the second crank pins 107c through 107h.

Accordingly, the center axial lines 106k and 107k of the crank pins 106c through 106h and 107c through 107h of the crank members 106 and 107, and the center axial lines 106b and 107b of the crank journals 106p, 106q, 106r, 107p, 107q, and 107r, are disposed parallel as to the input center axial line O1 in a state of being assembled to the continuously variable transmission BD.

Also, the crank pins 106c through 106h and 107c through 107h of the crank members 106 and 107 are joined such that the center axial lines 106k and 107k are at predetermined angle (60° with the present embodiment) intervals in the circumferential direction centered on the center axial lines 106b and 107b of the crank journals 106p, 106q, 106r, 107p, 107q, and 107r. Note that the first and second crank journals 106q and 107q are omitted from illustration in FIG. 4.

Figure 6A:
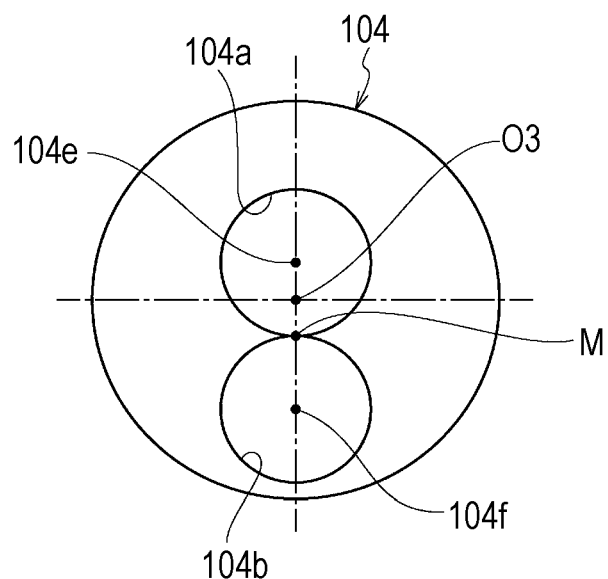
FIGS. 6A and 6B are side views illustrating two types of eccentric discs in the continuously variable transmission.
Figure 6B:
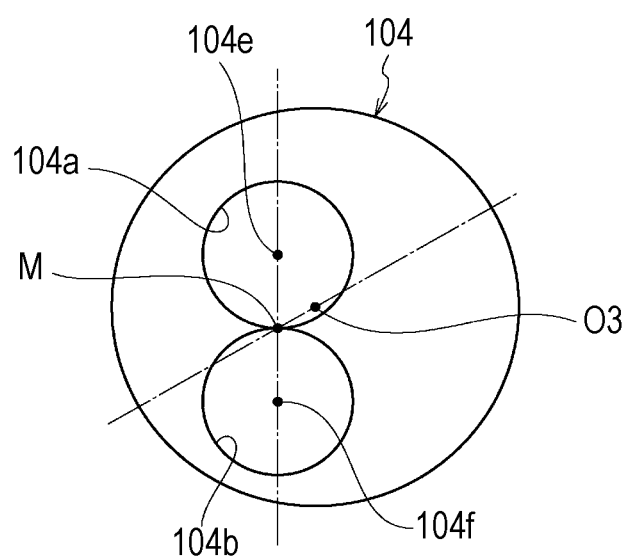

Also, as shown in FIGS. 6A and 6B, the two through holes 104a and 104b of the eccentric discs 104 through which the crank pins 106c through 106h and 107c through 107h pass are formed adjacent one to another, and also are formed such that a middle point M of the through holes 104a and 104b is offset from the first support point O3. Also, the two through holes 104a and 104b of the eccentric discs 104 are formed such that the middle points M of the through holes 104a and 104b of the multiple eccentric discs 104 are at predetermined angle (60° with the present embodiment) intervals in the circumferential direction centered on the first support point O3. Specifically, of the six eccentric discs 104 according to the present embodiment, the eccentric disc 104A through which the crank pins 106c and 107c pass, and the eccentric disc 104D through which the crank pins 106f and 107f pass, are formed with a line connecting the centers 104e and 104f of the through holes 104a and 104b being situated on a line passing through the first support point O3. Also, the eccentric disc 104B through which the crank pins 106d and 107d pass, the eccentric disc 104C through which the crank pins 106e and 107e pass, the eccentric disc 104E through which the crank pins 106g and 107g pass, and the eccentric disc 104F through which the crank pins 106h and 107h pass, are formed with a line connecting the middle point M and the first support point O3 intersecting a line connecting the centers 104e and 104f of the through holes 104a and 104b at an angle of 60°.

Figure 7:
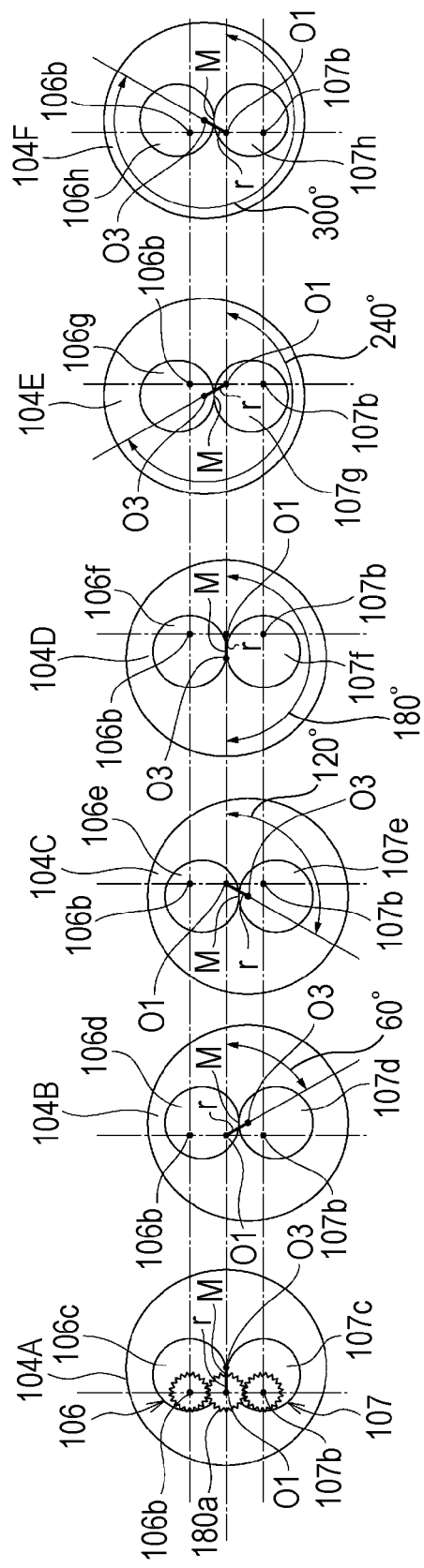
FIG. 7 is an explanatory diagram illustrating the positional relation of the eccentric discs and the crank pins configuring the continuously variable transmission.

Accordingly, the eccentric discs 104A through 104F have a positional relation such as illustrated in FIG. 7 when individually illustrated with the input center axial line O1 as the center. That is to say, the positions of the crank pins 106c through 106h and 107c through 107h each are at positions rotated by 60° clockwise centered on the center axial lines 106b and 107b, in a state where the eccentricity r as to the input center axial line O1 of the first support point O3 serving as the center of the eccentric discs 104A through 104F is the same, and the eccentric disks 104A through 104F also are in positional relationship each rotated by 60° clockwise centered on the input center axial line O1. Note that the angle at which the crank pins 106c through 106h and 107c through 107h are joined centered on the center axial lines 106b and 107b, and the relation between the through holes 104a and 104b formed in each eccentric disc 104 and the first support point O3 (e.g., the angle at which the line connecting the middle point M of the through holes 104a and 104b with the first support point O3 intersects with the line connecting the centers 104e and 104f of the two through holes 104a and 104b) is determined by the number of eccentric discs 104, i.e., is a value obtained by dividing 360° by the number of eccentric discs 104.

The journal supporting member 151 is an integrally-formed member of a cylindrical portion engaged in spline fashion with the tips of the output shafts S1 and S2 of the first and second engines ENG1 and ENG2, and a journal supporting portion 151h having two through holes 151a and 151b rotatably supporting the crank journals 106p and 107p of the crank members 106 and 107 through a slide bearing 157. Also, the crank journals 106q and 107q of the crank members 106 and 107 situated between the two eccentric discs 104C and 104D are rotatably supported by two through holes 152a and 152b formed in a journal supporting member 152 through a slide bearing 157.

Further, driven gears 106a and 107a are formed to the crank journals 106r and 107r of the crank members 106 and 107, with these driven gears 106a and 107a meshing with a pinion 180b of a rotational shaft 180a provided coaxially with the input center axial line O1, and also meshing with a ring gear 115 provided to the periphery of these.

The journal supporting members 151 and 152 rotatably supporting the two crank members 106 and 107, and the ring gear 115, are supported by a transmission case 160 of the first and second transmissions TM1 and TM2 (see FIG. 1) by way of bearings 102, 105, and 103, respectively.

The number of teeth of the driven gears 106a and 107a of the two crank members 106 and 107 is the same, with the two driven gears 106a and 107a being rotated at the same rotational speed by the pinion 180b being rotated by an actuator 180. The actuator 180 is configured of a DC motor and reducer and so forth, and normally rotates the pinion 180b synchronously with the rotations of the journal supporting member 151. Accordingly, as shown in FIGS. 8A through 8F, the crank members 106 and 107 and the eccentric discs 104 rotate integrally on the input center axial line O1, with the maximum amplitude of deviation W being expressed by $$W = D + 2 \cdot r$$

where D is the diameter of the eccentric disc 104, as can be seen in FIG. 8D. Note that FIGS. 8A through 8F illustrate states of the rotational angle of the crank members 106 and 107 and the eccentric disc 104 being α=0°, 60°, 120°, 180°, 240°, and 300°, respectively.

Also, the pinion 180b is made to rotate relative to the journal supporting member 151, by providing the pinion 180b with rotations above or below the rotations of the journal supporting member 151, with the rotations at this the journal supporting member 151 and pinion 180b synchronize as a reference. Control of the rotations by the actuator 180 can be realized by controlling the rotations of the pinion 180b given by reducing the rotations from the actuator 180 with a reducer (e.g., planetary gear), as to the rotations of the journal supporting member 151. At this time, the eccentricity r does not change in the event that the pinion 180b and the journal supporting member 151 are synchronous with no rotational difference.

Accordingly, by providing the pinion 180b with rotations above or below the rotations of the journal supporting member 151, the crank journals 106r and 107r having the driven gears 106a and 107a spin, whereby the first crank pins 106c through 106h and second crank pins 107c through 107h rotate synchronously centered on the first and second crank journals 106 and 107 respectively, thus adjusting the eccentricity r of the first support point O3 as to the input center axial line O1.

Also, the one-way clutch OWC includes an clutch inner 121 serving as an output member which rotates around an output center axial line O2 which is away from the input center axial line O1, a ring-shaped clutch outer 122 serving as an input member which oscillates around the output center axial line O2 upon external force in the rotational direction be applied thereupon, multiple rollers (engaging units) 123 inserted between the clutch outer 122 and clutch inner 121 to place the clutch outer 122 and the clutch inner 121 in a mutually locked state or unlocked state, and pressing members 126 which press the rollers 123 in a direction realizing a locked state. In the event that the rotational speed of the clutch outer 122 in the positive direction (e.g., the direction indicated by arrow RD1 in FIG. 3) exceeds the rotational speed of the clutch inner 121 in the positive direction, the rotational force input to the clutch outer 122 is transmitted to the clutch inner 121, and accordingly the oscillating motion of the clutch outer 122 can be converted into rotational motion of the clutch inner 121.

As shown in FIG. 2, the clutch inner 121 of the one-way clutch OWC is configured as a member integrally continuing in the axial direction, but the clutch outer 122 is divided into multiple pieces in the axial direction, the number thereof being the same as the number of the eccentric discs 104 and linking members 130, with each being capable of independently oscillating in the axial direction. The rollers 123 are inserted between clutch outer 122 and clutch inner 121 at each clutch outer 122.

One protruding portion 124 is provided in the circumferential direction on the ring-shaped clutch outer 122, with a second supporting point O4 distanced from the output center axial line O2 being provided to the protruding portion 124. A pin 125 is situated on the second supporting point O4 of each clutch outer 122, and a tip (other end portion) 132 of the linking member 130 is rotatably linked to the clutch outer 122 by the pin 125.

The linking member 130 has a ring portion 131 at one end side, with the inner circumference of a circular opening 133 of the ring portion 131 rotatably fitting the outer circumference of the eccentric disc 104 via a bearing 140. Accordingly, one end of the linking member 130 is rotatably linked to the outer circumference of the eccentric disc 104, and the other end of the linking member 130 is rotatably linked to the second supporting point O4 provided on the clutch outer 122 of the one-say clutch OWC, whereby a four-bar linkage mechanism, with the four joints of input center axial line O1, first support point O3, output center axial line O2, and second supporting point O4 serving as turning points being, is configured. Rotational motion applied from the journal supporting member 151 serving as an input shaft to the eccentric disc 104 via the two crank members 106 and 107 is transmitted to the clutch outer 122 of the one-way clutch OWC as oscillating motion of the clutch outer 122, and the oscillating motion of the clutch outer 122 is converted into the rotational motion of the clutch inner 121.

At this time, the eccentricity r of the eccentric disc 104 can be changed by moving, with the actuator 180, the pinion 180*b* of a variable gear ratio mechanism 112 configured of the two crank members 106 and 107, the actuator 180, and so forth. By changing the eccentricity r, the oscillation angle θ2 of the clutch outer 122 of the one-way clutch OWC can be changed, and accordingly, the ratio of revolutions (gear ratio, also written as "ratio i") of the clutch inner 121 as to the rotations of the journal supporting member 151 serving as the input shaft can be changed. Accordingly, the gear ratio of the rotational force input to the journal supporting member 151 being transmitted as rotational force to the clutch inner 121 of the one-way clutch 120 via the eccentric discs 104 and linking members 140 can be changed, and also by setting the eccentricity r to zero, a gear ratio of infinity can be set.

Figure 9A:
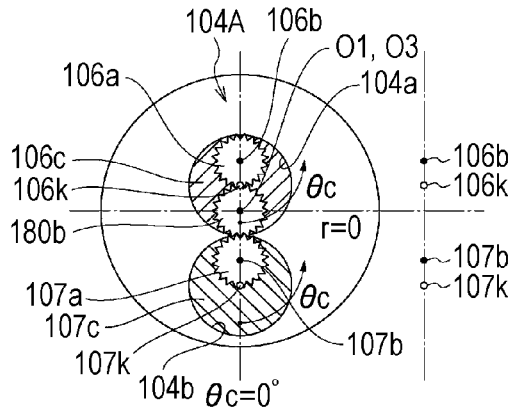
FIGS. 9A through 9E are explanatory diagrams illustrating states of changing eccentricity of an eccentric disc of the continuously variable transmission, every 45° in rotational angle of the crank members.
Figure 9B:
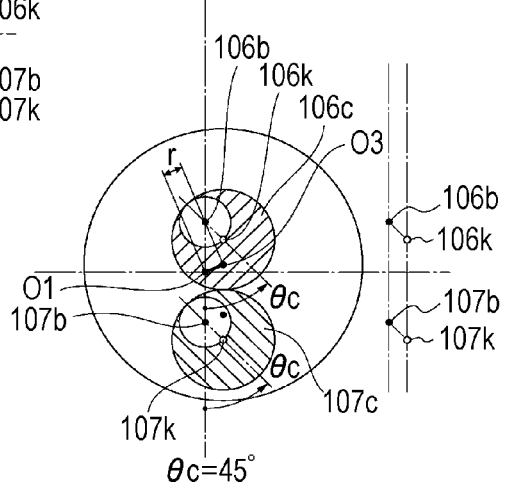

The transmission principle of the continuously variable transmission BD (BD1, BD2) described above will be described with reference to FIGS. 9A through 10C. Of FIGS. 9A through 9E, FIGS. 9A, 9C, and 9E are diagrams illustrating the change in eccentricity at each rotational angle θc of the crank members 106 and 107 when the pinion 180*b* is rotated relatively, and FIGS. 9B and 9D are diagrams where the relation between the center axial lines 106*b* and 107*b* (black dots) of the crank journals 106*r* and 107*r* and center axial lines 106*k* and 107*k* (white dots) of the crank pins 106*c* and 107*c* has been copied out from FIGS. 9A, 9C, and 9E. Note that the crank pins 106*c* and 107*c* are illustrated with hatching to facilitate understanding of the shapes, and further, the pinion 180*b* shown in FIG. 9A is omitted from FIGS. 9B through 9E, with the driven gears 106*a* and 107*a* being drawn as solid-line circles.

As shown in FIG. 9A, with the eccentric disc 104A, at rotational angle θc=0° of the crank members 106 and 107, the center axial lines 106*b* and 107*b* of the crank journals 106*e* and 107*r* are each at positions offset upwards as to the center axial lines 106*k* and 107*k* of the crank pins 106*c* and 107*c*, so the input center axial line O1 which is coaxial with the pinion 180*b*, and the first support point O3 which is the center of the eccentric disc 104A, are at the same position. Accordingly, the eccentricity r of the center (first support point O3) of the eccentric disc 104 as to the input center axial line O1 is zero, and the gear ratio i can be set to "infinity" (∞).

Figure 9C:
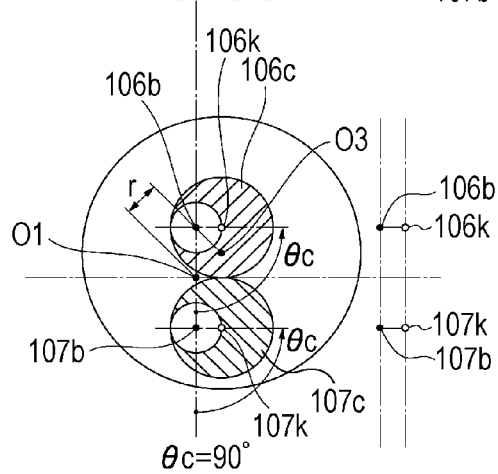
Figure 9D:
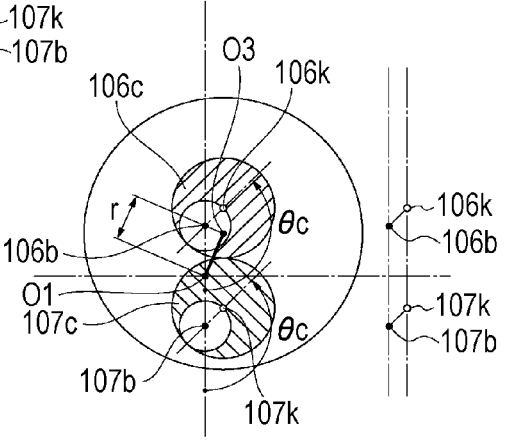

Next, as shown in FIGS. 9B through 9D, at rotational angles θc=45°, 90°, and 135°, of the crank members 106 and 107, the center axial lines 106*k* and 107*k* of the crank pins 106*c* and 107*c* turn in the same direction as to the center axial lines 106*b* and 107*b* of the crank journals 106*r* and 107*r*, so the center (first support point O3) of the eccentric disc 104 gradually moves away from the input center axial line O1, and the eccentricity r gradually increases.

Figure 9E:
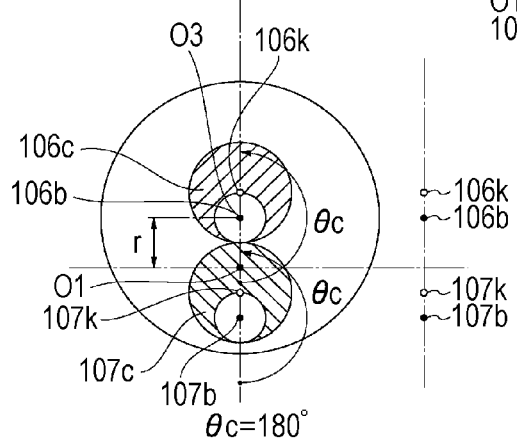

Finally, as shown in FIG. 9e, at rotational angle θc=180° of the crank members 106 and 107, the center axial lines 106*b* and 107*b* of the crank journals 106*r* and 107*r* are each at positions offset downwards as to the center axial lines 106*k* and 107*k* of the crank pins 106*c* and 107*c*, so the center (first support point O3) of the eccentric disc 104 is the farthest from the input center axial line O1, the eccentricity r is maximum, and a small gear ratio can be realized.

Figure 10A:
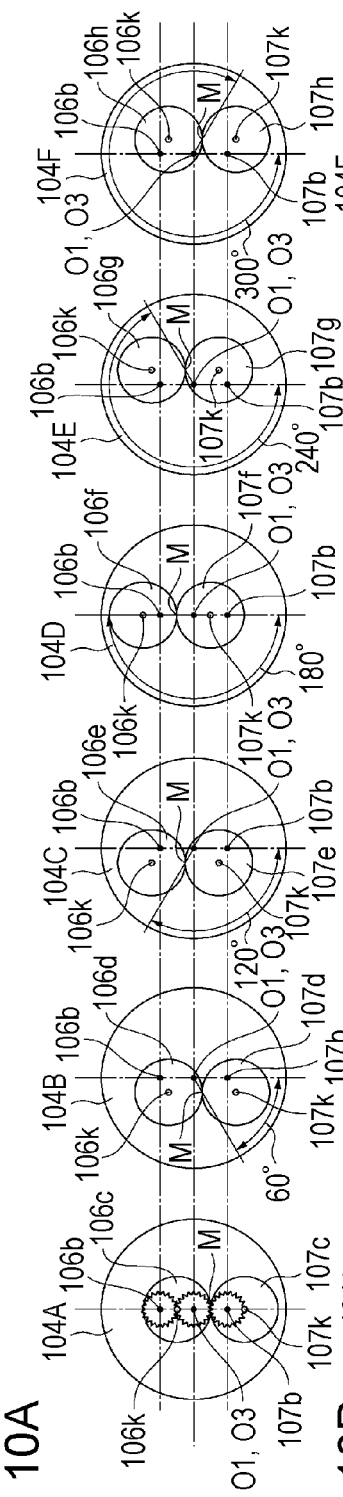
FIGS. 10A through 10C are diagrams illustrating the positional relation of the eccentric discs and crank pins at differing eccentricities in the continuously variable transmission, where
Figure 10B:
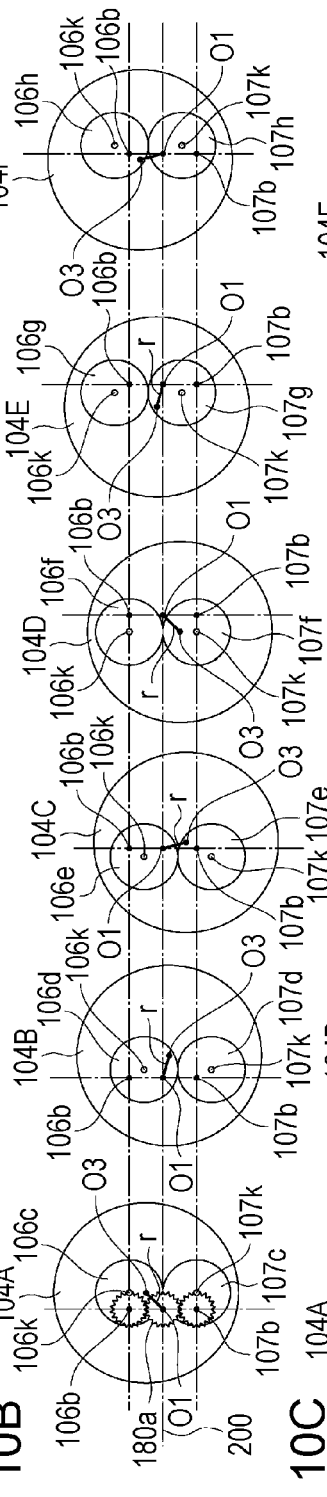
Figure 10C:
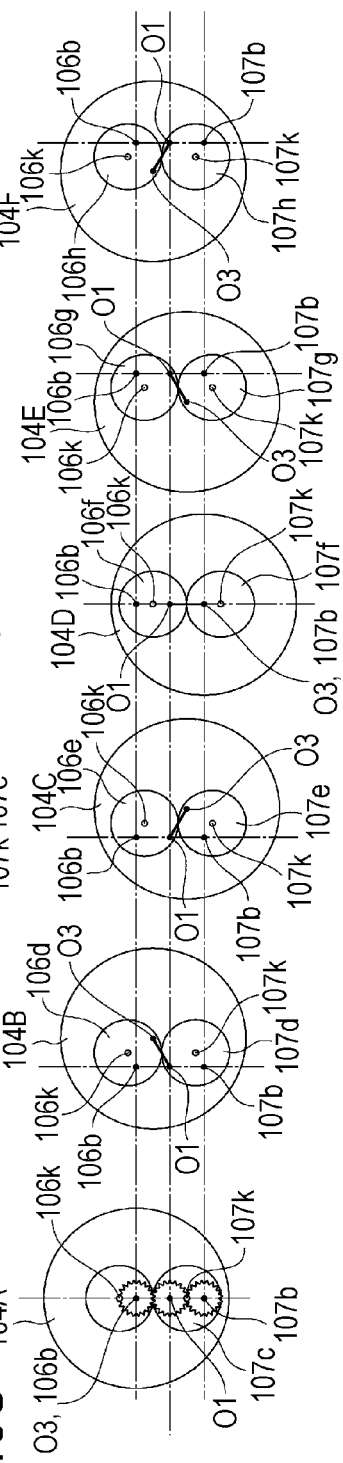

FIGS. 10A through 10C are diagrams viewing each of the eccentric discs 104A through 104F from the actuator 180 side, where FIG. 10A illustrates a case where the first support points O3 of the eccentric discs 104A through 104F match the input center axial line O1 and the eccentricity r is "zero", i.e., a case where the gear ratio i is infinity, FIG. 10B illustrates a case where the first support points O3 of the eccentric discs 104A through 104F are away from the input center axial line O1 and the eccentricity r is "medium", i.e., a case where the gear ratio i is medium, and FIG. 10C illustrates a case where the first support points O3 of the eccentric discs 104A through 104F are farthest from the input center axial line O1 and the eccentricity r is "great", i.e., a case where the gear ratio i is small.

Such adjustment of the eccentricity r by the rotational angle θc by the crank members 106 and 107 is performed by controlling the rotational speed of the rotational shaft 180*a* of the actuator 180 shown in FIG. 2 by a control unit 5 (see FIG. 1).

As shown in FIG. 11, with the continuously variable transmission BD a four-bar linkage mechanism having the input center axial line O1, the first support point O3, the output center axial line O2, and the second support point O4, as the four joints, with rotational motion applied from the journal supporting member 151 to the eccentric disc 104 being transmitted to the clutch outer 122 of the one-way clutch OWC as oscillating motion, and the oscillating motion of the clutch outer 122 is converted into the rotational motion of the clutch inner 121.

Figure 12A:
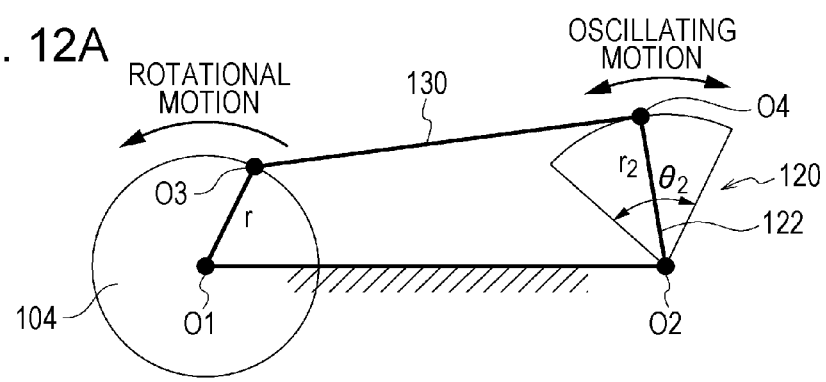
FIGS. 12A through 12C are operation diagrams illustrating change in the amount of oscillation in a one-way clutch outer member in a case of differing the eccentricity of eccentric discs of the continuously variable transmission, where

As shown in FIG. 12A, in the event that the eccentricity r of the eccentric disc 104 is set to "great", and the first support point O3 is rotated on the input center axial line O1 in the arrow direction, the oscillation angle $\theta_2$ of the clutch outer 122 of the one-way clutch OWC can be made greater, so a small gear ratio i can be realized.

Figure 12B:
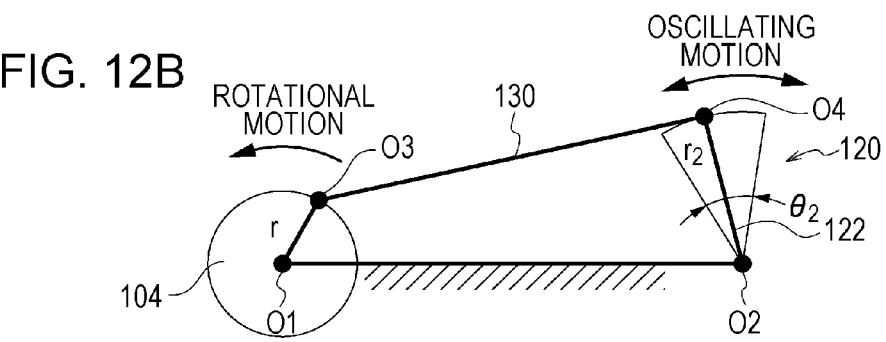

As shown in FIG. 12B, in the event that the eccentricity r of the eccentric disc 104 is set to "medium", the oscillation angle $\theta_2$ of the clutch outer 122 of the one-way clutch OWC can be made smaller than with the case in FIG. 12A, so a greater gear ratio i than with the case in FIG. 12A can be realized.

Figure 12C:
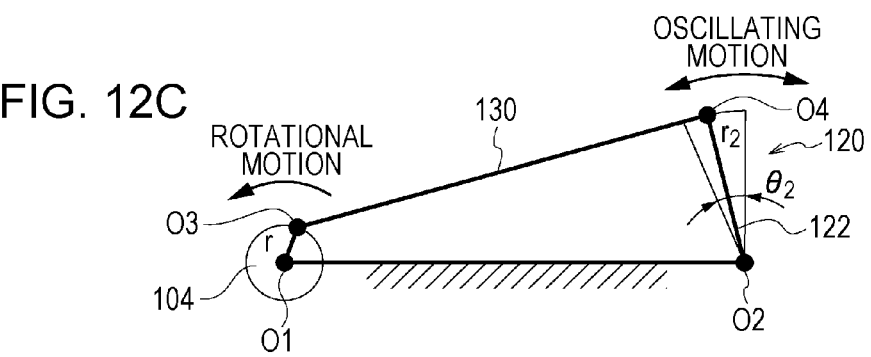

As shown in FIG. 12C, in the event that the eccentricity r of the eccentric disc 104 is set to "small", the oscillation angle $\theta_2$ of the clutch outer 122 of the one-way clutch OWC can be made smaller than with the case in FIG. 12B, so a greater gear ratio i than with the case in FIG. 12B can be realized.

Accordingly, the smaller the eccentricity r of the eccentric disc 104 is, the smaller the oscillation angle $\theta_2$ of the clutch outer 122 becomes while the gear ratio i becomes greater, and in the event that the eccentricity r of the eccentric disc 104 is set to "zero" the oscillation angle $\theta_2$ of the clutch outer 122 of the one-way clutch OWC can be made to be "zero", and accordingly the gear ratio i can be set to "infinity" ($\infty$).

Figure 13:
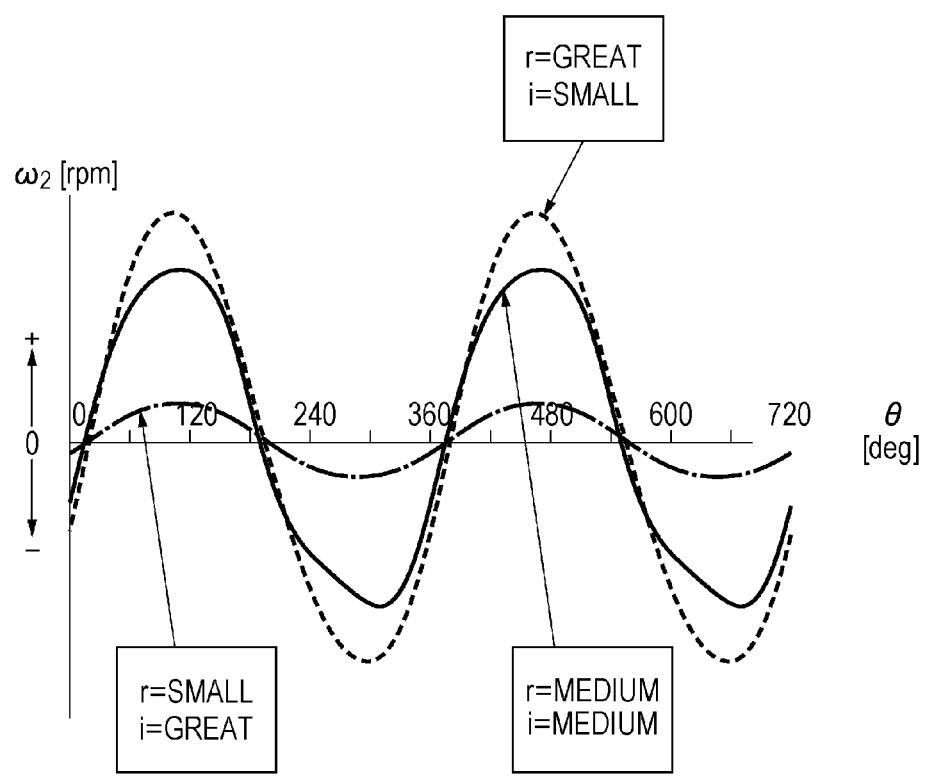
FIG. 13 is a diagram illustrating the relation between rotational angle of the input shaft and oscillating angular speed of the input member of the one-way clutch, in a case of varying the eccentricity (transmission gear ratio) of the eccentric disc rotating at the same speed with the input shaft between "great", "medium", and "small", with the continuously variable transmission.

As shown in FIG. 11, the clutch outer 122 of the one-way clutch OWC exhibits oscillating motion due to the force applied thereto from the eccentric disc 104 via the linking members 130. When the journal supporting member 151 rotating the eccentric disc 104 makes one rotation, the clutch outer 122 of the one-way clutch OWC makes one reciprocal oscillation. The oscillation cycle of the clutch outer 122 of the one-way clutch OWC is constant, regardless of the value of the eccentricity r of the eccentric disc 104, as shown in FIG. 13. The oscillating angular speed $\omega_2$ of the clutch outer 122 is determined by the rotational angular speed $\omega_1$ of the eccentric disc 104 (journal supporting member 151) and eccentricity r.

Figure 14:
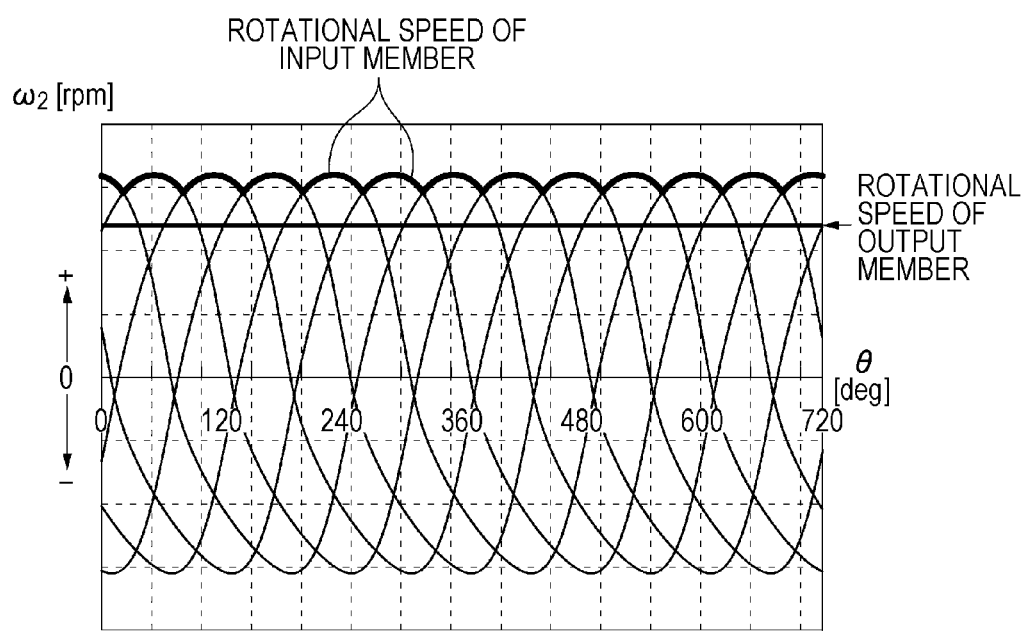
FIG. 14 is a diagram for describing a principle of obtaining output when power is transmitted from the input side (input shaft and eccentric disc) to the output side (output member of the one-way clutch) by multiple link members, with the continuously variable transmission.

The multiple linking members 130 connecting the journal supporting member 151 with the one-way clutch OWC have a ring portion 131 rotatably linked to the multiple eccentric discs 104 disposed at equal intervals in the circumferential direction around the input center axial line O1, so oscillating motion brought about at the clutch outer 122 of the one-way clutch OWC by the rotational motion of the eccentric discs 104 occurs in order with a certain phase, as shown in FIG. 14.

At this time, transmission of the force (torque) from the clutch outer 122 of the one-way clutch OWC to the clutch inner 121 is performed only under the condition that the rotational speed of the clutch outer 122 in the positive direction (the direction of the arrow RD1 in FIG. 3) has exceeded the rotational speed of the clutch inner 121 in the positive direction. That is to say, with the one-way clutch OWC, meshing (locking) of the clutch outer 122 and clutch inner 121 by way of the rollers 123 occurs only in the event that the rotational speed of the clutch outer 122 exceeds the rotational speed of the clutch inner 121, with the force of the clutch outer 122 being transmitted to the clutch inner 121 and driving force is generated.

After driving by one linking member 130 has ended, the rotational speed of the clutch outer 122 drops below the rotational speed of the clutch inner 121, and also the locking by the rollers 123 is disengaged by the driving force of another linking member 130, thus returning to a free state (spinning state). By this being performed by all of the linking members 130 in order, the oscillating motion is converted into one-directional rotational motion. Accordingly, only the force of the clutch outer 122 at a timing at which the rotational speed of the clutch inner 121 is exceeded is transmitted to the clutch inner 121 in order, and rotational force smoothed to being nearly flat is provided to the clutch inner 121.

Also, as shown in FIGS. 12A through 12C, with the continuously variable transmission BD (BD1, BD2) with this four-bar linkage mechanism, the gear ratio (the ratio indicating how many rotations the rotationally driven member 11 can be given for one rotation of the crankshaft of the first and second engines ENG1 and ENG 2 (see FIG. 1)) can be determined by changing the eccentricity r of the eccentric disc 104. In this case, setting the eccentricity r to zero allows the gear ratio i to be set to infinity ($\infty$), so that the oscillating angle $\theta_2$ transmitted to the clutch outer 122 can be made to be zero regardless of the crankshaft of the first and second engines ENG1 and ENG2 rotating. That is to say, the rotations of the clutch inner 121 of the one-way clutch OWC can be made to be zero even if the output shafts S1 and S2 (see FIG. 1) of the first and second engines ENG1 and ENG2 are rotating.

As described above, with the continuously variable transmissions BD1 and BD2 according to the present embodiment, in a configuration where rotational force from the first and second engines ENG1 and ENG2 is transmitted from eccentric discs 104 the clutch outer 122 of one-way clutches OWC1 and OWC2 via the linking member 130, provided are: a plurality of eccentric discs 104, disposed around the input center axial line O1 at equal intervals in the circumferential direction, each having at the center thereof a first support point O3 whereby the eccentricity r as to the input center axial line O1 is changeable and the eccentric discs rotate along with the journal supporting member 151 on the input center axial line O1 while maintaining the eccentricity, and two through holes 104a and 104b formed therein extending parallel to the input center axial line O1; and first and second crank members 106 and 107 having a plurality of first and second crank pins 106c through 106h and 107c through 107h which are rotatably passed through the two through holes 104a and 104b formed in the plurality of eccentric discs 104, and which are each linked, and a plurality of first and second crank journals 106p, 106q, 106r, 107p, 107q, and 107r, having center axial lines 106b and 107b at positions equidistantly offset from the center axial lines 106k and 107k of the first and second crank pins 106c through 106h and 107c through 107h; wherein the actuator 180 is configured to synchronously rotate the first and second crank pins 106c through 106h and 107c through 107h centered on the first and second crank journals 106r and 107r respectively, so as to adjust the eccentricity of the first support points O3 as to the input center axial line O1. Accordingly, there is no need to form internal teeth to the eccentric discs 104 to mesh with a gear or to have sliding faces formed thereupon, as with conventional eccentric discs, so working of the parts can be simplified, productivity of the eccentric discs 104 and resultantly productivity of the continuously variable transmissions BD1 and BD2 can be improved, and costs can be reduced.

Also, the continuously variable transmission BD may further include a ring gear configured to mesh with driven gears 106a and 107a configured at the end portion of the first and second crank journals 106r and 107r and rotatably support the first and second crank journals 106r and 107r, the ring gear 115 being rotatable as to the transmission case 160 along with the first and second crank journals 106r and 107r; with the actuator which the variable gear ratio mechanism 112 has further including a pinion 180b rotating on the input center axial line O1 and meshing with the driven gears driven gears 106a and 107a of the first and second crank journals 106r and 107r, the actuator 180 being fixed to the transmission case 160. Thus, the driven gears 106a and 107a serve as planetary gears along with the ring gear 115, the pinion 180b serves as a sun gear, and the journal supporting member 151 serves as a carrier, thereby forming a planetary gear train. Accordingly, the eccentricity r of the first support point O3 as to the input center axial line O1 can be adjusted just by controlling the rotational speed of the actuator 180, so the gear ratio can be easily changed. Also, the pinion 180b rotating on the input center axial line O1 provided to the actuator 180 meshes with the driven gears 106a and 107a of the crank journals 106r and 107r of the two crank members 106 and 107, so axial alignment is facilitated.

Also, the automobile driving system according to the present embodiment includes: first and second engines ENG1 and ENG2 generating rotational force; a continuously variable transmission BD configured to shift and output rotational force generated from the first and second engines ENG1 and ENG2; and a rotationally driven member 11 linked to the clutch inner 121 of the one-way clutch OWC, so as to transmit rotational force, transmitted to the clutch inner 121, to the driving wheels 2; wherein rotational force generated by the first and second engines ENG1 and ENG2 is input to the rotationally driven member 11 via the continuously variable transmission BD. Thus, the continuously variable transmission BD enables smooth change in output rotations by continuously adjusting the gear ratio without changing the engine rotations of the first and second engines ENG1 and ENG2, so the first and second engines ENG1 and ENG2 can be driven at efficient rotations, leading to reduced fuel consumption of the first and second engines ENG1 and ENG2. Also, enabling an infinite gear ratio enables the force transmission from the journal supporting member 151 to the output shaft (transmission output shaft 127 in FIGS. 3 and 11) to be cut off, so the continuously variable transmission also serves as a clutch, which means that a clutch itself can be done away with and costs can be reduced.

Figure 15:
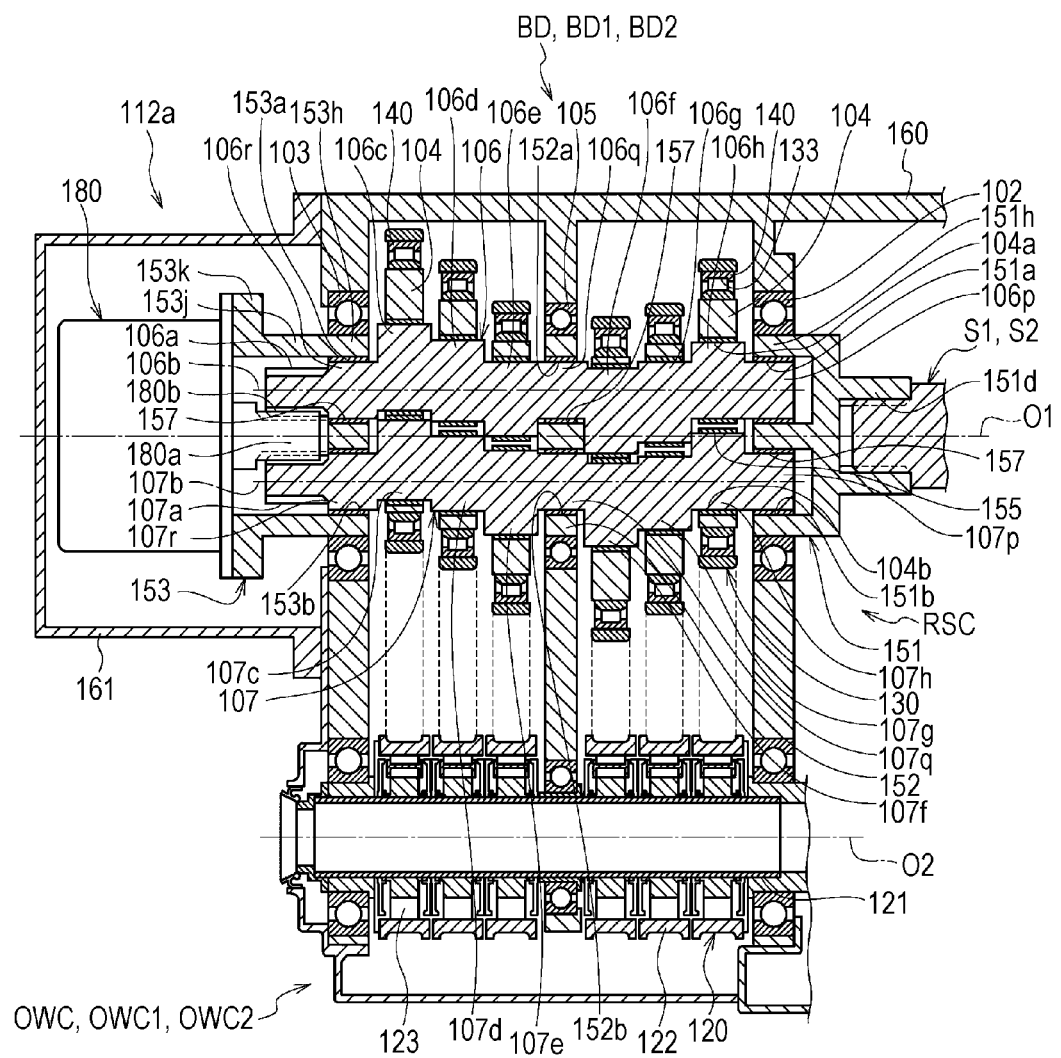
FIG. 15 is a cross-sectional diagram illustrating a modification of the continuously variable transmission according to the embodiment of the present invention.

FIG. 15 illustrates a modification of the continuously variable transmission BD. Portions which are the same as or equivalent to parts of the continuously variable transmission illustrated in the embodiments above are denoted with the same reference numerals, and description will be omitted or simplified.

As illustrated in FIG. 15, with the continuously variable transmission BD, the configuration of a variable gear ratio mechanisms 112a, which is linked to output shafts S1 and S2 (see FIG. 1) of the first and second engines ENG1 and ENG2 (see FIG. 1) to convert the rotational motion of the output shafts S1 and S2 to oscillating motion, and enables variable change of gear ratio, differs from that in the above embodiment.

With this variable gear ratio mechanisms 112a, another journal supporting member 153 is disposed between the crank journals 106r and 107r of the two crank members 106 and 107 and the bearing 103, instead of the ring gear 115 in the above embodiment.

The other journal supporting member 153 is formed integrally of a disc portion 153h having two through holes 153a and 153b for rotatably supporting the cylindrical portions of the crank journals 106r and 107r of the crank members 106 and 107 through a slide bearing 157, a cylindrical portion 153j extending in the axial direction from the circumferential portion of the disk portion 153h, and a flange portion 153k formed at the edge of the cylindrical portion 153j. The actuator 180 is fixed to this flange portion 153k. Note that reference numeral 161 denotes a cover material attached to the transmission case 160 to cover the actuator 180.

Also, with the crank journals 106r and 107r of the crank members 106 and 107, driven gears 106a and 107a are formed at the tip portions of the cylindrical portions supported by the through holes 153a and 153b of the other journal supporting member 153, and these driven gears 106a and 107a mesh with the pinion 180b provided to the rotational shaft 180a of the actuator 180.

With the variable gear ratio mechanisms 112a configured thus, the journal supporting member 151 rotates the first and second crank members 106 and 107 along with the output shafts S1 and S2 of the first and second engines ENG1 and ENG2 (see FIG. 1), whereby the eccentric discs 104 rotate integrally with a predetermined eccentricity r, and also the entire actuator 180 attached to the other journal supporting member 153 also integrally rotates. The eccentricity r is adjusted by rotationally driving the pinion 180b of the actuator 180 so that the crank journals 106r and 107r of the first and second crank members 106 and 107 synchronously rotate, adjusting the rotational angle θc of the crank pins 106c through 106h and 107c through 107h as to the eccentric discs 104.

Accordingly, with the continuously variable transmission BD in this modification as well, controlling the rotational angle of the actuator 180 enables the eccentricity r of the first support point O3 as to the input center axial line O1 to be adjusted, so the gear ratio can be easily changed. Also, the pinion 180b rotating on the input center axial line O1 provided to the actuator 180 meshes with the driven gears 106a and 107a of the crank journals 106r and 107r of the two crank members 106 and 107, so axial alignment is facilitated. Other configurations and operations are the same as with the first embodiment.

Note that the present invention is not restricted to the above-described embodiments, and that various alterations, modifications, and the like may be made as appropriate. The materials, shapes, dimensions, numbers, locations, and so forth, of the components of the above-described embodiments are optionally selectable as long as the present invention can be carried out, and are not restricted.

For example, while description has been made in the above embodiments regarding a configuration where two through holes 104a and 104b are provided to each eccentric disc 104 through which the first and second crank pins pass, a configuration may be made where one slot is provided as a through hole through which both of the first and second crank pins pass.

Also, while description has been made in the above embodiments regarding a configuration where the diameters of the crank pins are the same at both the first crank member 106 and second crank member 107, and also the distance between the center axial line of the crank pins and the center axial line of the crank journals are the same distance, but neither the diameters nor the distances are restricted to being the same.

Figure 16:
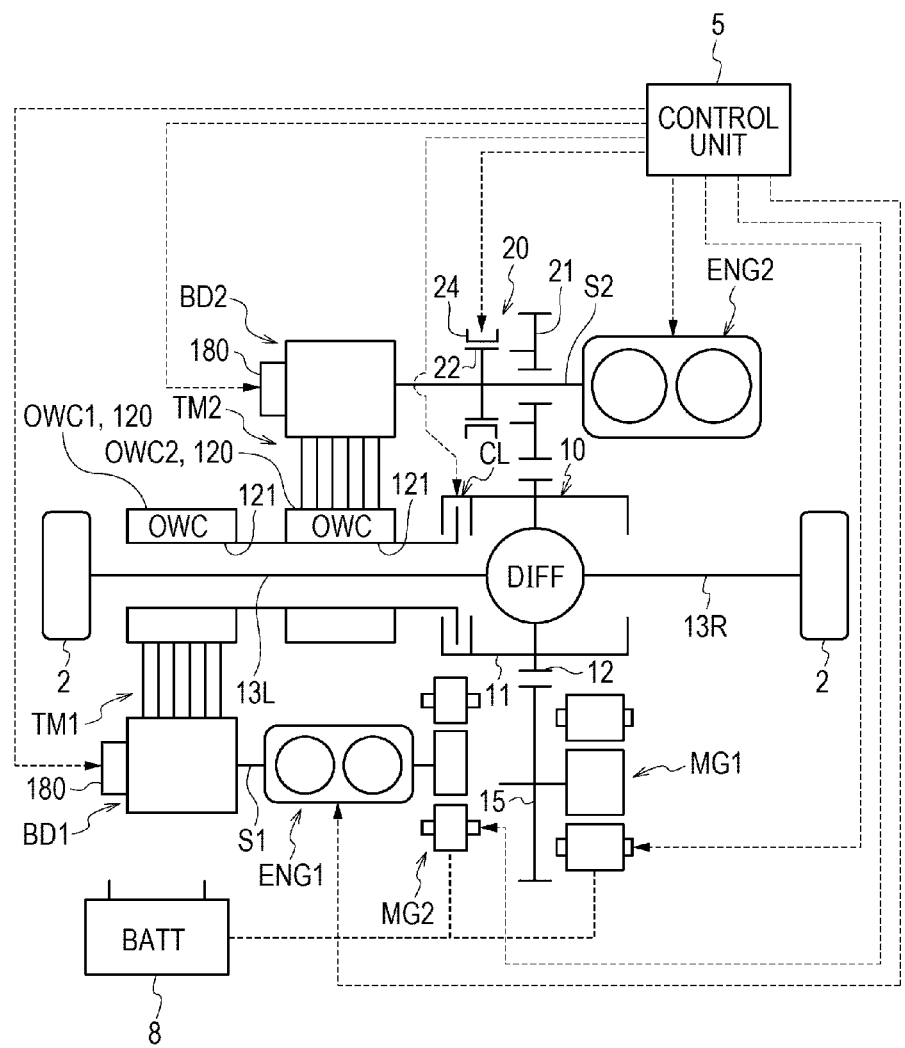
FIG. 16 is an explanatory diagram illustrating an automobile driving system according to another embodiment of the present invention.
Figure 17:
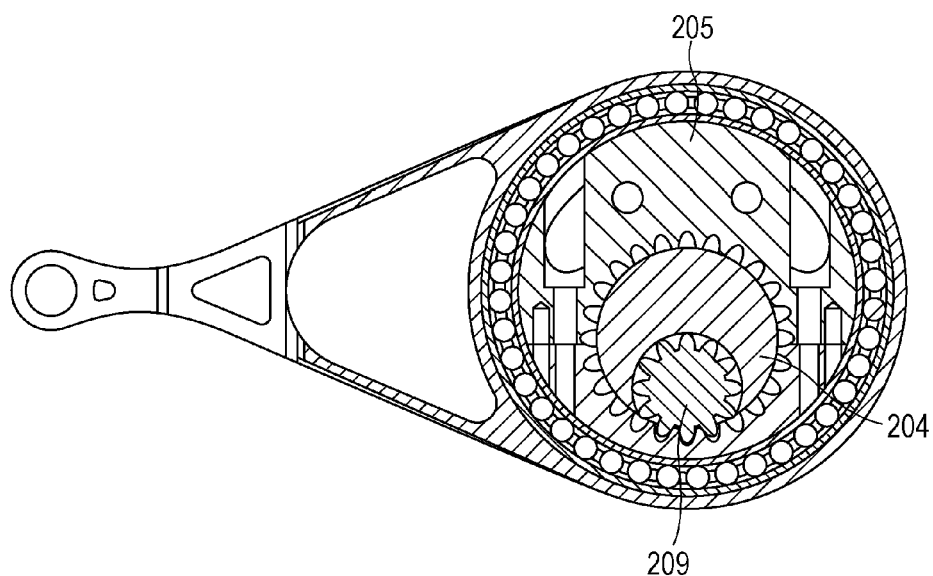
FIG. 17 is a cross-sectional diagram illustrating a mechanism for converting rotational motion into oscillating motion with a conventional continuously variable transmission.

Also, as shown in FIG. 1, an arrangement has been described wherein the first one-way clutch OWC1 and second one-way clutch OWC2 are disposed on the left and right sides of the differential device 10, and the clutch inners 121 of the first and second one-way clutches OWC1 and OWC2 are connected to the rotationally driven member 11 via the clutch mechanisms CL1 and CL2, but an arrangement may be made such as shown in FIG. 16 wherein the first and second one-way clutches OWC1 and OWC2 are disposed on one side of the differential device 10, and the output members thereof are linked and then connected to the rotationally driven member 11 through a single clutch mechanism CL.

Also, while description has been made with the above embodiments regarding a case of having two engines ENG1 and ENG2, two transmissions TM1 and TM2, two one-way clutches OWC1 and OWC2, two motor generators MG1 and MG2, and two clutch mechanisms CL1 and CL2, the present invention is also applicable to a configuration having one each of an engine, transmission, one-way clutch, and clutch mechanism or to a configuration having three or more. Also, while gasoline engines or diesel engines may be primarily used for the engines, other engines such as hydrogen engines or the like may be used, and further, different types of engines may be combined and used.

Obviously, numerous modifications and variations of the present invention are possible in light of the above teachings. It is therefore to be understood that within the scope of the appended claims, the invention may be practiced otherwise than as specifically described herein.

What is claimed is:

1. A continuously variable transmission to shift and output rotational force generated from a force source, the continuously variable transmission comprising:
a one-way clutch comprising:
an input shaft rotatable about an input center axial line under the rotational force;
a plurality of eccentric discs disposed around the input center axial line at equal intervals in a circumferential direction, each of the eccentric discs comprising:
a first support point arranged at a center of the eccentric disc, an eccentricity of the eccentric disc as to the input center axial line being changeable by the first support point, the eccentric discs being rotatable along with the input shaft about the input center axial line while maintaining the eccentricity; and
through holes extending parallel to the input center axial line;
a first crank member comprising:
a plurality of first crank pins rotatably passed through the through holes provided in the plurality of eccentric discs, the first crank pins being linked to each other; and
a plurality of first crank journals having center axial lines provided at positions equidistantly offset from center axial lines of the first crank pins;
a second crank member comprising:
a plurality of second crank pins rotatably passed through the through holes provided in the plurality of eccentric discs, the second crank pins being linked to each other; and
a plurality of second crank journals having center axial lines provided at positions equidistantly offset from center axial lines of the second crank pins;
an output member rotatable about an output center axial line which is distanced from the input center axial line;
an input member provided to oscillate on the output center axial line under external rotational direction force; and
an engaging member to place the input member and the output member in one of a mutually locked state and an unlocked state,
the one-way clutch being provided to transmit the rotational force input to the input member to the output member when the rotational speed of the input member in the forward direction exceeds the rotational speed of the output member in the forward direction so as to convert oscillating motion of the input member into rotational motion of the output member;
a plurality of linking members each including a first end and a second end, the first end being rotatably linked to the first supporting points on a perimeter of the eccentric discs, the second end being rotatably linked to a second supporting point provided on the input member of the one-way clutch at a position distanced from the output center axial line, such that rotational motion provided from the input shaft to the eccentric discs is transmitted to the input member of the one-way clutch as oscillating motion of the input member; and
a variable gear ratio mechanism comprising:
an actuator to synchronously rotate the first crank pins and the second crank pins each centered on the first and second crank journals, so as to adjust an eccentricity of the first support points as to the input center axial line, thereby changing an oscillating angle of oscillating motion transmitted from the eccentric discs to the input member of the one-way clutch,
wherein the gear ratio is changed when rotational force input to the input shaft is transmitted as rotational force, to the output member of the one-way clutch via the eccentric discs and the linking members, and
wherein setting of the eccentricity to zero is enabled so as to set the gear ratio to infinity.

2. The continuously variable transmission according to claim 1, further comprising:
driven gears configured to the first and second crank journals;
a case; and
a ring gear to mesh with the driven gears and to rotatably support the first and second crank journals, the ring gear being rotatable as to the case along with the first and second crank journals,
wherein the actuator further includes a pinion rotating on the input center axial line and meshing with the driven gears of the first and second crank journals, and
wherein the actuator is fixed to the case.

3. The continuously variable transmission according to claim 1, further comprising:
driven gears configured to rotatably support the first and second crank journals;
a case; and
a journal supporting member configured to rotatably support the first and second crank journals, the journal supporting member being rotatable as to the case along with the first and second crank journals,
wherein the actuator further includes a pinion rotating on the input center axial line and meshing with the driven gears of the first and second crank journals, and
wherein the actuator is fixed to the journal supporting member.

4. The continuously variable transmission according to claim 1, wherein
the eccentric discs are adjacent to each other along the input center axial line.

5. An automobile driving system comprising:
an engine serving as the force source to generate rotational force;
a continuously variable transmission according to claim 1, configured to shift and output rotational force generated from the engine;
driving wheels; and
a rotationally driven member linked to the output member of the one-way clutch to transmit rotational force transmitted to the output member to the driving wheels,
wherein rotational force generated by the engine is input to the rotationally driven member via the continuously variable transmission.

* * * * *